(12) United States Patent
Nakano et al.

(10) Patent No.: US 11,492,520 B2
(45) Date of Patent: *Nov. 8, 2022

(54) REINFORCING FILM

(71) Applicant: NITTO DENKO CORPORATION, Ibaraki (JP)

(72) Inventors: Takeshi Nakano, Ibaraki (JP); Keiji Hayashi, Ibaraki (JP); Souya Jo, Ibaraki (JP); Shogo Sasaki, Ibaraki (JP); Kenichi Kataoka, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 259 days.

This patent is subject to a terminal disclaimer.

(21) Appl. No.: 16/650,931

(22) PCT Filed: Sep. 18, 2018

(86) PCT No.: PCT/JP2018/034532
§ 371 (c)(1),
(2) Date: Mar. 26, 2020

(87) PCT Pub. No.: WO2019/065376
PCT Pub. Date: Apr. 4, 2019

(65) Prior Publication Data
US 2020/0291269 A1 Sep. 17, 2020

(30) Foreign Application Priority Data

Sep. 28, 2017 (JP) .............................. JP2017-188472
Sep. 5, 2018 (JP) .............................. JP2018-166420

(51) Int. Cl.
*C09J 7/38* (2018.01)
*B32B 7/12* (2006.01)
(Continued)

(52) U.S. Cl.
CPC ................ *C09J 7/385* (2018.01); *B32B 7/12* (2013.01); *B32B 27/36* (2013.01); *C09J 133/08* (2013.01);
(Continued)

(58) Field of Classification Search
CPC ....... B32B 7/12; B32B 27/36; B32B 27/2571; C08F 265/06; C08L 2312/00; C09J 4/06;
(Continued)

(56) References Cited

U.S. PATENT DOCUMENTS 6,009,290 A 12/1999 Mochida
9,146,417 B2 * 9/2015 Huh ..................... G02B 5/3033
(Continued)

FOREIGN PATENT DOCUMENTS

JP H9-146386 A 6/1997
JP 2010-138370 A 6/2010
(Continued)

OTHER PUBLICATIONS

International Search Report issued for corresponding International Patent Application No. PCT/JP2018/034532 dated Nov. 13, 2018, along with an English translation.
(Continued)

*Primary Examiner* — Sanza L. McClendon
(74) *Attorney, Agent, or Firm* — Hauptman Ham, LLP

(57) ABSTRACT

A reinforcing film comprises a pressure sensitive adhesive layer laminated and fixed on a principal surface of a film substrate. The pressure sensitive adhesive layer is formed of a photocurable composition containing a photocurable agent and a base polymer having a crosslinked structure. A frictional force of the pressure sensitive adhesive layer measured with a frictional force microscope at a frequency of 5 Hz is preferably 2 to 5 times a frictional force at a frequency of 0.1 Hz. After photocuring of the pressure sensitive
(Continued)

adhesive layer, a frictional force of a photocured pressure sensitive adhesive layer measured with the frictional force microscope at a frequency of 5 Hz is preferably not less than 5 times a frictional force measured at a frequency of 0.1 Hz.

12 Claims, 1 Drawing Sheet

(51) Int. Cl.
    *B32B 27/36*     (2006.01)
    *C09J 133/08*     (2006.01)

(52) U.S. Cl.
    CPC ....... *B32B 2571/00* (2013.01); *C09J 2433/00* (2013.01)

(58) Field of Classification Search
    CPC ..... C09J 7/30; C09J 7/385; C09J 11/06; C09J 133/06; C09J 133/02; C09J 133/066; C09J 133/08; C09J 139/06; C09J 2301/122; C09J 2301/312; C09J 2301/416; C09J 2433/00
    See application file for complete search history.

(56) References Cited

U.S. PATENT DOCUMENTS

| | | | |
|---|---|---|---|
| 9,236,303 B2* | 1/2016 | Joo | B29C 39/006 |
| 9,389,455 B2* | 7/2016 | Jang | C09J 133/02 |
| 9,816,011 B2* | 11/2017 | Kim | G02B 1/14 |
| 10,310,333 B2* | 6/2019 | Yasui | G02F 1/133711 |
| 10,920,108 B2* | 2/2021 | Suzuki | C08L 33/14 |
| 2006/0153057 A1* | 7/2006 | Miyata | G11B 7/256 |
| | | | 369/275.1 |
| 2012/0094119 A1 | 4/2012 | Fujita et al. | |
| 2012/0274881 A1* | 11/2012 | Jang | G02F 1/133528 |
| | | | 524/561 |
| 2012/0321819 A1* | 12/2012 | Kim | C09J 133/08 |
| | | | 524/558 |
| 2013/0071656 A1* | 3/2013 | Yamagata | C09J 7/22 |
| | | | 525/216 |
| 2013/0083262 A1* | 4/2013 | Kim | G02B 30/27 |
| | | | 349/194 |
| 2013/0280527 A1* | 10/2013 | Niimi | C09J 7/29 |
| | | | 428/354 |
| 2014/0045319 A1* | 2/2014 | Joo | C08F 8/10 |
| | | | 525/289 |
| 2014/0158300 A1* | 6/2014 | Hayata | C09J 7/385 |
| | | | 156/345.3 |
| 2014/0160406 A1* | 6/2014 | Huh | G02B 5/3033 |
| | | | 359/483.01 |
| 2014/0315018 A1* | 10/2014 | Yamagata | C08L 33/08 |
| | | | 525/204 |
| 2015/0024198 A1* | 1/2015 | Yamagata | B32B 27/283 |
| | | | 524/265 |
| 2016/0215181 A1* | 7/2016 | Fujita | C09J 139/06 |
| 2016/0264825 A1* | 9/2016 | Ukei | C09J 123/12 |
| 2016/0280967 A1* | 9/2016 | Ukei | C09J 7/22 |
| 2017/0043566 A1 | 2/2017 | Kanno et al. | |
| 2017/0218231 A1* | 8/2017 | Suzuki | C09J 133/02 |
| 2018/0157125 A1* | 6/2018 | Yasui | G02B 1/16 |

FOREIGN PATENT DOCUMENTS

| | | |
|---|---|---|
| JP | 2013-185007 A | 9/2013 |
| JP | 2014-227453 A | 12/2014 |
| JP | 2015-10198 A | 1/2015 |
| JP | 2017-132977 A | 8/2017 |
| WO | 2012/114921 A1 | 8/2012 |
| WO | 2015/163115 A1 | 10/2015 |

OTHER PUBLICATIONS

Written Opinion issued for corresponding International Patent Application No. PCT/JP2018/034532 dated Nov. 13, 2018, along with an English translation.

\* cited by examiner

REINFORCING FILM

CROSS REFERENCE TO RELATED APPLICATION

This application is a National Stage of International Application No. PCT/JP2018/034532, filed on Sep. 18, 2018, which designates the United States and was published in Japan, and which claims priority to Japanese Patent Application Nos. 2017-188472 filed Sep. 28, 2017 and 2018-166420 filed Sep. 5, 2018, in the Japanese Patent Office. Both of the aforementioned applications are hereby incorporated by reference in their entireties.

TECHNICAL FIELD

The present invention relates to a reinforcing film to be attached to a surface of a device.

BACKGROUND ART

A pressure sensitive adhesive film may be attached to a surface of an optical device such as a display or an electronic device for the purpose of protecting the surface or imparting impact resistance or the like. Such a pressure sensitive adhesive film normally has a pressure sensitive adhesive layer laminated and fixed on a principal surface of a film substrate, and is bonded to a surface of a device with the pressure sensitive adhesive layer interposed therebetween.

In a state before practical use of a device, such as assembly processing or transportation, by temporarily attaching a pressure sensitive adhesive film to a surface of a device or a device constituent component, an adherend can be inhibited from being scratched or damaged. Such a pressure sensitive adhesive film is a process material, which is peeled off and removed before practical use of the device. As described in Patent Document 1, a pressure sensitive adhesive film to be used as a process material is required to have low adhesion, be easily releasable from an adherend, and leave no adhesive deposit on the adherend.

Patent Document 2 discloses a pressure sensitive adhesive film which is attached to a surface of a device at the time of assembly, processing, transportation or the like of a device, and is used kept attached in practical use of the device. Such a pressure sensitive adhesive film has a function of reinforcing a device by dispersion of impact on the device, impartment of rigidity to a flexible device or the like in addition to a function of protecting a surface.

In bonding of a pressure sensitive adhesive film to an adherend, a bonding defect may occur such as ingress of air bubbles or displacement of a bonding position. When a bonding defect occurs, an operation of peeling off a pressure sensitive adhesive film from an adherend and bonding another pressure sensitive adhesive film (rework) is performed. A pressure sensitive adhesive film to be used as a process material is easily subjected to rework because the pressure sensitive adhesive film is designed on the assumption that it is peeled off from an adherend. On the other hand, in general, it is difficult to subject a reinforcing film to rework because the reinforcing film is not assumed to be peeled off from a device, and is firmly adhered to a surface of a device.

Patent Document 3 discloses a pressure sensitive adhesive sheet (pressure sensitive adhesive layer) designed so as to have low adhesion immediately after being bonded to an adherend, and have adhesive force increased with the passage of time. A pressure sensitive adhesive film having such a pressure sensitive adhesive layer laminated and fixed on a film substrate can be used as a reinforcing film having reworkability because it is easily peeled off from an adherend immediately after being bonded to the adherend, and is firmly bonded after elapse of a predetermined time.

PRIOR ART DOCUMENTS

Patent Documents

Patent Document 1: Japanese Patent Laid-open Publication No. 2013-185007
Patent Document 2: Japanese Patent Laid-open Publication No. 2017-132977
Patent Document 3: WO2015/163115

SUMMARY OF THE INVENTION

Problems to be Solved by the Invention

It is hard to say that a reinforcing film whose adhesive force with an adherend is changed with the passage of time has sufficient flexibility with respect to process lead time. For example, a reinforcing film provided with a pressure sensitive adhesive layer whose adhesive force increases with the passage of time is required to be subjected to examination of a bonding state and rework within a predetermined time until adhesive force is increased after the film is bonded to an adherend. In addition, when a reinforcing film is bonded to the entire surface of a device or a device component, followed by performing processing in which the reinforcing film is removed from some regions, etc., it is necessary to perform the processing in a period until adhesive force is increased.

In view of the circumstances described above, an object of the present invention is to provide a reinforcing film which is easily subjected to rework immediately after the film is bonded to an adherend, makes it possible to freely set a time until adhesive force is increased after the film is bonded to the adherend, and can be firmly adhered to the adherend due to the increase of adhesive force.

Means for Solving the Problems

A reinforcing film of the present invention includes a pressure sensitive adhesive layer laminated and fixed on one principal surface of a film substrate. The pressure sensitive adhesive layer includes a photocurable composition containing a base polymer and a photocurable agent. In the pressure sensitive adhesive layer, a frictional force at a frequency of 5 Hz as measured with a frictional force microscope is preferably 2 to 5 times a frictional force at a frequency of 0.1 Hz as measured with a frictional force microscope. In the photocured pressure sensitive adhesive layer, a frictional force at a frequency of 5 Hz is preferably not less than 5 times a frictional force at a frequency of 0.1 Hz as measured with a frictional force microscope.

A gel fraction of a photocurable composition that forms the pressure sensitive adhesive layer is preferably 60% or more, more preferably 65% or more, especially preferably 70% or more. A base polymer of the photocurable composition is preferably an acrylic polymer, and a molecular weight of the base polymer is preferably 100,000 or more. It is preferable that a crosslinked structure is introduced into the acrylic base polymer. It is preferable that the acrylic base polymer contains a hydroxy group-containing monomer and/or a carboxy group-containing monomer as a monomer unit. Such a monomer unit can serve as a crosslinked structure introduction point. The acrylic base polymer may contain about 5 to 50% by weight of a monomer component having a homopolymer glass transition temperature of 40° C. or higher.

Preferably the photocurable composition that forms the pressure sensitive adhesive layer contains 1 to 50 parts by weight of a photocurable agent based on 100 parts by weight of the base polymer. As the photocurable agent, for example, a polyfunctional (meth)acrylate is used. The functional group equivalent weight of the photocurable agent is preferably 100 to 500 g/eq.

Effects of the Invention

In the reinforcing film of the present invention, the pressure sensitive adhesive layer is a photocurable composition, and by photocuring the pressure sensitive adhesive layer after the film is bonded to an adherend, adhesive force with the adherend is increased. Before photocuring, the reinforcing film is easily subjected to rework because it has small adhesive force with an adherend, and after photocuring, the reinforcing film contributes to improvement of reinforcement and reliability of a device because it exhibits high adhesive force. Since the photocurable pressure sensitive adhesive makes it possible to freely set the timing of curing after bonding of the film to an adherend, the reinforcing film of the present invention can be flexibly adapted to process lead time.

MODE FOR CARRYING OUT THE INVENTION

Figure 1:
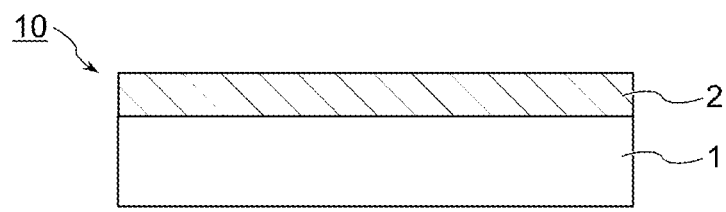
FIG. 1 is a sectional view showing stacking structure of a reinforcing film.

FIG. 1 is a sectional view showing one embodiment of a reinforcing film. The reinforcing film 10 includes a pressure sensitive adhesive layer 2 on one principal surface of a film substrate 1. The pressure sensitive adhesive layer 2 is laminated and fixed on one principal surface of the film substrate 1. The pressure sensitive adhesive layer 2 is a photocurable pressure sensitive adhesive including a photocurable composition, and when irradiated with an active ray such as an ultraviolet ray, the pressure sensitive adhesive layer 2 is cured, leading to an increase in adhesive strength with the adherend.

Figure 2:
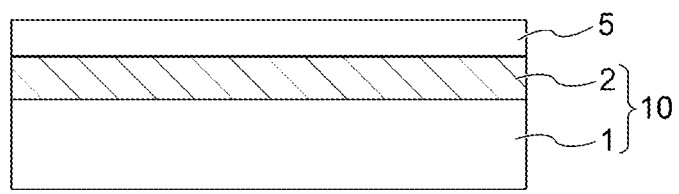
FIG. 2 is a sectional view showing stacking structure of a reinforcing film.
Figure 3:
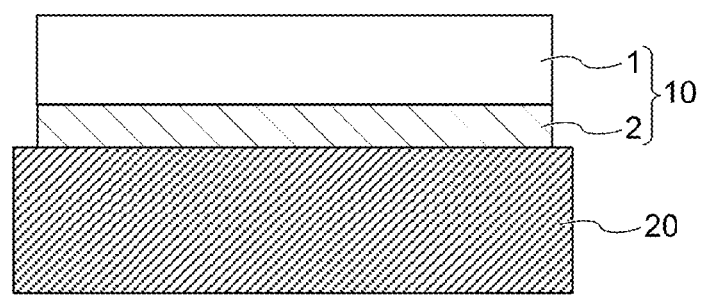
FIG. 3 is a sectional view showing a device on which a reinforcing film attached.

FIG. 2 is a sectional view of a reinforcing film in which a separator 5 is temporarily attached onto a principal surface of the pressure sensitive adhesive layer 2. FIG. 3 is a sectional view showing a state in which the reinforcing film 10 is attached to a surface of a device 20.

The separator 5 is peeled off and removed from the surface of the pressure sensitive adhesive layer 2, and the exposed surface of the pressure sensitive adhesive layer 2 is bonded to the surface of the device 20 to attach the reinforcing film 10 to the surface of the device 20. In this state, the pressure sensitive adhesive layer 2 is not photocured yet, and the reinforcing film 10 (pressure sensitive adhesive layer 2) is temporarily attached on the device 20. By photocuring the pressure sensitive adhesive layer 2, adhesive force at an interface between the device 20 and the pressure sensitive adhesive layer 2 is increased, so that the device 20 and the reinforcing film 10 are fixed to each other.

The term "fixed" refers to a state in which two stacked layers are firmly adhered to each other, so that it is difficult to peel off the layers from each other at an interface therebetween. The term "temporarily attached" refers to a state in which adhesive force between two stacked layers is small, so that the layers can be easily peeled off from each other at an interface therebetween.

In the reinforcing film shown in FIG. 2, the film substrate 1 and the pressure sensitive adhesive layer 2 are fixed to each other, and the separator 5 is temporarily attached to the pressure sensitive adhesive layer 2. When the film substrate 1 and the separator 5 are peeled off from each other, peeling occurs at an interface between the pressure sensitive adhesive layer 2 and the separator 5, and a state is maintained in which the pressure sensitive adhesive layer 2 is fixed on the film substrate 1. A pressure sensitive adhesive does not remain on the separator 5 after peeling.

In the device to which the reinforcing film 10 shown in FIG. 3 is attached, the device 20 and the pressure sensitive adhesive layer 2 are temporarily attached before the pressure sensitive adhesive layer 2 is photocured. When the film substrate 1 and the device 20 are peeled off from each other, peeling occurs at an interface between the pressure sensitive adhesive layer 2 and the device 20, and a state is maintained in which the pressure sensitive adhesive layer 2 is fixed on the film substrate 1. It is easy to perform rework because the pressure sensitive adhesive does not remain on the device 20. After the pressure sensitive adhesive layer 2 is photocured, adhesive force with the pressure sensitive adhesive layer 2 and the device 20 is increased, so that it is difficult to peel off the film 1 from the device 20, and when the film 1 is peeled off from the device 20, cohesive fracture of the pressure sensitive adhesive layer 2 may occur.

<Film Substrate>

As the film substrate 1, a plastic film is used. For fixing the film substrate 1 and the pressure sensitive adhesive layer 2 to each other, it is preferable that a pressure sensitive adhesive layer 2-side surface of the film substrate 1 is not subjected to release treatment.

The thickness of the film substrate is, for example, about 4 to 500 µm. From the viewpoint of reinforcing the device by imparting rigidity or impact relaxation, the thickness of the film substrate 1 is preferably 12 µm or more, more preferably 20 µm or more, further preferably 30 µm or more, especially preferably 45 µm or more. From the viewpoint of imparting flexibility to the reinforcing film and enhancing the handling property, the thickness of the film substrate 1 is preferably 300 µm or less, more preferably 200 µm or less. From the viewpoint of securing both mechanical strength and flexibility, the compressive strength of the film substrate 1 is preferably 100 to 3000 kg/cm$^2$, more preferably 200 to 2900 kg/cm$^2$, further preferably 300 to 2800 kg/cm$^2$, especially preferably 400 to 2700 kg/cm$^2$.

Examples of the plastic material that forms the film substrate 1 include polyester-based resins, polyolefin-based resins, cyclic polyolefin-based resins, polyamide-based resins, polyimide-based resins, polyether ether ketones and polyether sulfones. In a reinforcing film for an optical device such as a display, the film substrate 1 is preferably a transparent film. In addition, when an active ray is applied from the film substrate 1-side to photocure the pressure sensitive adhesive layer 2, it is preferable that the film substrate 1 has transparency to the active ray to be used for curing the pressure sensitive adhesive layer. Polyester-based resins such as polyethylene terephthalate, polybutylene terephthalate and polyethylene naphthalate are suitably used because they have both mechanical strength and transparency. When an active ray is applied from the adherend side, the adherend may have transparency to the active ray, and the film substrate 1 is not required to be transparent to the active ray.

A surface of the film substrate 1 may be equipped with functional coatings such as an easily adhesive layer, a slippery layer, a release layer, an antistatic layer, a hard coat layer and an antireflection layer. As described above, for fixing the film substrate 1 and the pressure sensitive adhesive layer 2 to each other, it is preferable that a release layer is not provided on the pressure sensitive adhesive layer 2-side surface of the film substrate 1.

[Pressure Sensitive Adhesive Layer]

The pressure sensitive adhesive layer 2 laminated and fixed on the film substrate 1 includes a photocurable composition containing a base polymer and a photocurable agent. Before being photocured, the pressure sensitive adhesive layer 2 has small adhesive force with an adherend such as a device or a device component, and is therefore easily subjected to rework. The adhesive force of the pressure sensitive adhesive layer 2 to an adherend is improved by photocuring, and therefore the reinforcing film is hardly peeled off from a device even during use of the device, so that excellent adhesion reliability is exhibited.

A thermosetting pressure sensitive adhesive may be cured with the passage of time in a storage state, whereas a photocurable pressure sensitive adhesive is hardly cured in a general storage environment, and is cured when irradiated with an active ray such as an ultraviolet ray. Thus, the reinforcing film of the present invention has the advantage that the timing of curing the pressure sensitive adhesive layer 2 can be freely set, and the reinforcing film can be flexibly adapted to process lead time or the like.

<Adhesive Strength>

From the viewpoint of making it easy to peel off the reinforcing film from an adherend and preventing an adhesive deposit on an adherend after peeling the reinforcing film, the adhesive force between the pressure sensitive adhesive layer 2 before photocuring and the adherend is preferably 1.3 N/25 mm or less. From the viewpoint of preventing the reinforcing sheet from being peeled off in storage or handling, the adhesive force between the pressure sensitive adhesive layer 2 before photocuring and the adherend is preferably 0.005 N/25 mm or more, more preferably 0.01 N/25 mm or more, further preferably 0.1 N/25 mm or more, especially preferably 0.3 N/25 mm or more.

From the viewpoint of adhesion reliability in practical use of a device, the adhesive force between the photocured pressure sensitive adhesive layer 2 and the adherend is preferably 10 N/25 mm or more, more preferably 12 N/25 mm or more, further preferably 14 N/25 mm or more. The adhesive force between the photocured pressure sensitive adhesive layer 2 and the adherend is preferably not less than 10 times the adhesive force between the pressure sensitive adhesive layer 2 and the adherend before photocuring.

For a flexible display panel, a flexible printed circuit board (FPC), or a device with a display panel integrated with a printed circuit board, a flexible substrate material is used, and from the viewpoint of heat resistance and dimensional stability, a polyimide film is generally used. A reinforcing film in which a pressure sensitive adhesive layer has the above-described adhesive force to a polyimide film as a substrate is easily peeled off before photocuring of the pressure sensitive adhesive, and has excellent adhesion reliability after photocuring.

<Thickness>

The thickness of the pressure sensitive adhesive layer 2 is, for example, about 1 to 300 μm. The adhesiveness with the adherend tends to be improved as the thickness of the pressure sensitive adhesive layer 2 increases. On the other hand, when the pressure sensitive adhesive layer 2 has an excessively large thickness, fluidity before photocuring may be high, resulting in difficult handling. Thus, the thickness of the pressure sensitive adhesive layer 2 is preferably 5 to 100 μm, more preferably 8 to 50 μm, further preferably 10 to 40 μm, especially preferably 13 to 30 μm.

<Transparency>

When the reinforcing film is used for an optical device such as a display, the total light transmittance of the pressure sensitive adhesive layer 2 is preferably 80% or more, more preferably 85% or more, further preferably 90% or more. The haze of the pressure sensitive adhesive layer 2 is preferably 2% or less, more preferably 1% or less, further preferably 0.7% or less, especially preferably 0.5% or less.

<Frictional Force>

From the viewpoint of suppressing undesired peeling of the pressure sensitive adhesive layer 2 from the adherend before photocuring and facilitating peeling in rework or the like, it is preferable that the frictional force of the pressure sensitive adhesive layer 2, as measured in a tapping mode with a frictional force microscope (FFM), at a frequency of 5 Hz is 2 to 5 times the frictional force at a frequency of 0.1 Hz. In addition, when the ratio of the frictional forces at frequencies of 0.1 Hz and 5 Hz in the pressure sensitive adhesive layer 2 is within the aforementioned range, adhesive force to the adherend after photocuring tends to increase, leading to improvement of adhesion reliability.

In FFM, a force acting between a probe of a scanning probe microscope (SPM) and a surface of a sample is converted into a displacement (twist amount) of a flat spring of a cantilever, and this displacement is electrically detected. The amount of displacement is proportional to a differential voltage, and the frictional force is proportional to the spring constant and displacement amount of the cantilever. Therefore, the frictional force is proportional to an FFM differential voltage. The ratio of the frictional force at a frequency of 5 Hz to the frictional force at a frequency of 0.1 Hz is equal to a ratio of FFM differential signals of both the frictional forces. The frictional force of the pressure sensitive adhesive layer is measured under vacuum. However, if an accurate measurement under vacuum is difficult due to undulation of the film, etc., measurement is performed under atmospheric pressure (normal pressure). The measured value under vacuum is almost identical to the measured value under normal pressure.

The frictional force in nanotribology tends to reflect the adhesiveness of the surface of the pressure sensitive adhesive layer to the adherend, and a smaller frictional force means that the surface of the pressure sensitive adhesive is in a state closer to liquid, and less viscous. When the surface of the pressure sensitive adhesive layer has viscosity, the frictional force increases, and the frictional force measured by the FFM shows frequency dependence. A frictional force measured at a specific frequency is apt to reflect the individual physical properties of constituent components of the pressure sensitive adhesive composition, whereas the frequency dependence tends to more accurately reflect the properties of the surface. As the frequency dependence of the frictional force decreases, the viscosity is reduced, and thus the liquid property is enhanced, and as the frequency dependence increases, viscosity is increased, leading to enhancement adhesiveness to the adherend. For example, when the base polymer of the pressure sensitive adhesive layer and the photocurable agent are not completely compatible with each other, the frictional force and the frequency dependence of the frictional force tend to decrease because the liquid photocurable agent bleeds out to the interface between an adherend, so that an adhesion hindrance layer (Weak Boundary Layer; WBL) is formed, leading to enhancement of the liquid property.

By controlling compatibility between the base polymer and the photocurable agent, a small amount of the photocurable agent may bleed out to the surface of the pressure sensitive adhesive layer to form a WBL. When a WBL is formed, the properties of the surface (adhesion interface) are changed while the bulk property of the pressure sensitive adhesive layer is retained. In other words, when a WBL is formed, the frictional force and the frequency dependence of the frictional force tends to decrease while the hardness of the pressure sensitive adhesive layer is retained, so that peeling in rework is facilitated and an adhesive deposit on an adherend can be suppressed.

When the frictional force of the pressure sensitive adhesive layer at a frequency of 5 Hz before photocuring is not more than 5 times the frictional force at a frequency of 0.1 Hz, the pressure sensitive adhesive layer 2 and the adherend tend to be easily peeled off from each other before photocuring. When compatibility between the base polymer and the photocurable agent is excessively low, the photocurable agent considerably bleeds out, a WBL that is substantially liquid is formed on the surface of the pressure sensitive adhesive layer, so that the frictional force and frequency dependence of the frictional force are reduced. When the frequency dependence of the frictional force is excessively low, adhesion failure easily occurs because it is difficult to retain shear. When the frequency dependence of the frictional force of the pressure sensitive adhesive layer is excessively small, contamination of the adherend due to bleed out of the photocurable agent or peeling at the interface between the pressure sensitive adhesive layer and the film substrate may occur. Thus, in the pressure sensitive adhesive layer, the frictional force at a frequency of 5 Hz is preferably not less than 2 times, more preferably not less than 3 times, further preferably not less than 3.5 times the frictional force at a frequency of 0.1 Hz.

From the viewpoint of securing both moderate adhesiveness to the adherend and releasability from the adherend, the FFM difference signal of the pressure sensitive adhesive layer 2 at a frequency of 5 Hz before photocuring is preferably 0.01 to 1 V more preferably 0.05 to 0.9 V further preferably 0.1 to 0.8 V especially preferably 0.2 to 0.7 V as measured using a cantilever having a spring constant of 40 N/m.

In the photocured pressure sensitive adhesive layer 2, the frictional force at a frequency of 5 Hz is preferably not less than 5 times, more preferably not less than 5.5 times the frictional force at a frequency of 0.1 Hz as measured with FFM from the viewpoint of enhancing the adhesion reliability of the reinforcing film. The FFM differential signal of the pressure sensitive adhesive layer 2 at a frequency of 5 Hz after photocuring is preferably 0.1 V or more, more preferably 0.2 V or more, further preferably 0.3 V or more as measured with a cantilever having a spring constant of 40 N/m. From the viewpoint of enhancing adhesion reliability, it is preferable that the frictional force of the pressure sensitive adhesive layer after photocuring is as large as possible. Thus, the upper limit of the frictional force is not particularly limited. The FFM differential signal at 5 Hz as measured with a cantilever with a spring constant of 40 N/m is generally 10 V or less, and more preferably 5 V or less when consideration is given to balance of the properties of the pressure sensitive adhesive.

The frictional force of the pressure sensitive adhesive layer 2 at a frequency of 5 Hz after photocuring is preferably not less than 1.5 times, more preferably not less than 2 times, further preferably not less than 2.5 times, especially preferably not less than 3 times the frictional force of the pressure sensitive adhesive layer 2 at a frequency of 5 Hz before photocuring. As the ratio of the frictional forces before and after photocuring becomes higher, the ratio of increase in adhesive force by photocuring tends to increase. Generally, the frictional force after photocuring is not more than 20 times, preferably not more than 10 times the frictional force before photocuring.

<Composition>

The composition of the pressure sensitive adhesive layer 2 is not particularly limited as long as it contains a base polymer and a photocurable agent, and the adhesive force to the adherend is increased by photocuring. From the viewpoint of enhancing the efficiency of curing by irradiation with an active ray, it is preferable that the pressure sensitive adhesive composition (photocurable composition) that forms the pressure sensitive adhesive layer 2 contains a photopolymerization initiator. It is preferable that a cross-linked structure is introduced into the base polymer for increasing the hardness of the pressure sensitive adhesive layer before photocuring so that the reinforcing film can be easily peeled off from the adherend during rework.

(Base Polymer)

The base polymer is a main constituent component of the pressure sensitive adhesive composition, and is a main factor that determines the adhesive force of the pressure sensitive adhesive. The type of the base polymer is not particularly limited, and an acrylic polymer, a silicone-based polymer, a urethane-based polymer, a rubber-based polymer or the like may be appropriately selected. In particular, the pressure sensitive adhesive composition is preferably one containing an acrylic polymer as a base polymer because it is excellent in optical transparency and adhesiveness, and characteristics such as frictional force can be easily controlled, and it is preferable that an acrylic polymer constitutes 50% by weight or more of the pressure sensitive adhesive composition.

A polymer containing (meth)acrylic acid alkyl ester as a main constituent monomer component is preferably used as the acrylic polymer. In this specification, the "(meth)acryl" means acryl and/or methacryl.

As the (meth)acrylic acid alkyl ester, a (meth)acrylic acid alkyl ester with the alkyl group having 1 to 20 carbon atoms is preferably used. The alkyl group of the (meth)acrylic acid alkyl ester may be linear or branched. Specific examples of the (meth)acrylic acid alkyl ester include methyl (meth)acrylate, ethyl (meth)acrylate, butyl (meth)acrylate, isobutyl (meth)acrylate, s-butyl (meth)acrylate, t-butyl (meth)acrylate, pentyl (meth)acrylate, isopentyl (meth)acrylate, neopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, isotridodecyl (meth)acrylate, tetradecyl (meth)acrylate, isotetradecyl (meth)acrylate, pentadecyl (meth)acrylate, cetyl (meth)acrylate, heptadecyl (meth)acrylate, octadecyl (meth)acrylate, isooctadecyl (meth)acrylate, nonadecyl (meth)acrylate and aralkyl (meth)acrylate.

The content of the (meth)acrylic acid alkyl ester is preferably 40% by weight or more, more preferably 50% by weight or more, further preferably 55% by weight or more based on the total amount of monomer components that form the base polymer.

The acrylic base polymer preferably contains a monomer unit having a crosslinkable functional group as a copolymer component. Examples of the monomer having a crosslinkable functional group include hydroxy group-containing monomers and carboxy group-containing monomers. The base polymer may include either or both of hydroxy group-containing monomer and carboxy group-containing monomer as the copolymer component. The base polymer preferably contains hydroxy group-containing monomer as the copolymer component. The hydroxyl group and the carboxy group of the base polymer serve as reaction points with a crosslinker as described later. Introduction of a crosslinked structure into the base polymer tends to increase the cohesive force leading to improvement of adhesiveness of the pressure sensitive adhesive layer 2 and reduction of fluidity of the pressure sensitive adhesive, so that an adhesive deposit on an adherend during rework tends to be suppressed.

Examples of the hydroxy group-containing monomer include 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 10-hydroxydecyl (meth)acrylate, 12-hydroxylauryl (meth)acrylate and [4-(hydroxymethyl) cyclohexyl]methyl acrylate. Examples of the carboxy group-containing monomer include (meth)acrylic acid, 2-carboxyethyl (meth)acrylate, carboxypentyl (meth)acrylate, itaconic acid, maleic acid, fumaric acid and crotonic acid.

In the acrylic base polymer, the total amount of the hydroxy group-containing monomer and the carboxy group-containing monomer based on the total amount of the constituent monomer components is preferably 1 to 30% by weight, more preferably 3 to 25% by weight, further preferably 5 to 20% by weight. In particular, it is preferable that the content of a (meth)acrylic acid ester containing a hydroxy group is within the above-mentioned range.

Preferably the acrylic base polymer contains a nitrogen-containing monomer such as N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-acryloylmorpholine, a N-vinylcarboxylic acid amide, N-vinylcaprolactam or the like as a constituent monomer component. An acrylic base polymer containing a nitrogen-containing monomer component contributes to prevention of local whitening, local swelling, peeling or the like of the pressure sensitive adhesive layer because a moderate water-absorbing property is exhibited in a wet heat environment, and local absorption of water by the pressure sensitive adhesive is suppressed.

In the acrylic base polymer, the content of the nitrogen-containing monomer based on the total amount of the constituent monomer components is preferably 1 to 30% by weight, more preferably 3 to 25% by weight, further preferably 5 to 20% by weight. Preferably, the acrylic base polymer contains N-vinylpyrrolidone as a nitrogen-containing monomer in an amount within the above-mentioned range.

When the acrylic base polymer contains both a hydroxy group-containing monomer and a nitrogen-containing monomer as monomer components, the cohesive force and transparency of the pressure sensitive adhesive tend to be enhanced. In the acrylic base polymer, the total amount of the hydroxy group-containing monomer and the nitrogen-containing monomer is preferably 5 to 50% by weight, more preferably 10 to 40% by weight, further preferably 15 to 35% by weight based on the total amount of the constituent monomer components.

Besides the above-described monomer components, the acrylic base polymer may include monomer components such as cyano group-containing monomers, vinyl ester monomers, aromatic vinyl monomers, epoxy group-containing monomers, vinyl ether monomers, sulfo group-containing monomers, phosphoric acid group-containing monomers, and acid anhydride group-containing monomers.

The adhesive force of the pressure sensitive adhesive layer before photocuring is easily influenced by the constituent components and the molecular weight of the base polymer. From the viewpoint of securing both moderate adhesiveness and reworkability, the weight average molecular weight of the acrylic base polymer is preferably 100,000 to 5,000,000, more preferably 300,000 to 3,000,000, further preferably 500,000 to 2,000,000. When a crosslinked structure is introduced into the base polymer, the molecular weight of the base polymer is a molecular weight before introduction of the crosslinked structure.

As the content of high-Tg monomer components in the constituent components of the base polymer increases, the pressure sensitive adhesive tends to be hardened. The high-Tg monomer means a monomer having a high glass transition temperature (Tg) of the homopolymer. Examples of the monomer having a homopolymer Tg of 40° C. or higher include (meth)acryl-based monomers such as dicyclopentanyl methacrylate (Tg: 175° C.), dicyclopentanyl acrylate (Tg: 120° C.), isobornyl methacrylate (Tg: 173° C.), isobornyl acrylate (Tg: 97° C.), methyl methacrylate (Tg: 105° C.), 1-adamantyl methacrylate (Tg: 250° C.) and 1-adamantyl acrylate (Tg: 153° C.); amide group-containing vinyl monomers such acryloyl morpholine (Tg: 145° C.), dimethylacrylamide (Tg: 119° C.), diethylacrylamide (Tg: 81° C.), dimethylaminopropylacrylamide (Tg: 134° C.), isopropylacrylamide (Tg: 134° C.) and hydroxyethylacrylamide (Tg: 98° C.); and N-vinylpyrrolidone (Tg: 54° C.).

In the acrylic base polymer, the content of monomers having a homopolymer Tg of 40° C. or higher is preferably 3% by weight or more, more preferably 5 to 50% by weight, further preferably 10 to 40% by weight based on the total amount of the constituent monomer components. For forming a pressure sensitive adhesive layer having moderate hardness and excellent reworkability, it is preferable that a monomer component having a Tg of 80° C. or higher, more preferably a monomer component having a homopolymer Tg of 100° C. or higher, is contained as a monomer component of the base polymer. In the acrylic base polymer, the content of monomers having a homopolymer Tg of 100° C. or higher based on the total amount of the constituent monomer components is preferably 0.1% by weight or more, more preferably 0.5% by weight or more, further preferably 1% by weight or more, especially preferably 3% by weight or more. In particular, it is preferable that the content of methyl methacrylate is within the above-mentioned range.

An acrylic polymer as a base polymer is obtained by polymerizing the monomer components using various known methods such as solution polymerization, emulsion polymerization and bulk polymerization. A solution polymerization method is preferable from the viewpoint of balance of properties such as an adhesive force and a retaining force of the pressure sensitive adhesive, cost, and the like. As a solvent for solution polymerization, ethyl acetate, toluene or the like is used. The solution concentration is normally about 20 to 80% by weight. As the polymerization initiator, various known polymerization initiators such as azo-based polymerization initiators and peroxide-based polymerization initiators can be used. For adjusting the molecular weight, a chain-transfer agent may be used. The reaction temperature is normally about 50 to 80° C., and the reaction time is normally about 1 to 8 hours.

(Crosslinker)

From the viewpoint of imparting a moderate cohesive force to the pressure sensitive adhesive, it is preferable that a crosslinked structure is introduced into the base polymer. For example, a crosslinked structure is introduced by adding a crosslinker to the solution after polymerization of the base polymer and heating the mixture if necessary. Examples of the crosslinker include isocyanate-based crosslinkers, epoxy-based crosslinkers, oxazoline-based crosslinkers, aziridine-based crosslinkers, carbodiimide-based crosslinkers and metal chelate-based crosslinkers. Such a crosslinker forms a crosslinked structure by reacting with functional groups such as a hydroxy group and a carboxy group which are introduced into the base polymer. Isocyanate-based crosslinkers and epoxy-based crosslinkers are preferable because they have high reactivity with the hydroxy group and the carboxy group of the base polymer, so that introduction of a crosslinked structure is facilitated.

As an isocyanate-based crosslinker, a polyisocyanate having two or more isocyanate groups per molecule is used. Examples of the polyisocyanate-based crosslinker include lower aliphatic polyisocyanates such as butylene diisocyanate and hexamethylene diisocyanate; cycloaliphatic isocyanates such as cyclopentylene diisocyanate, cyclohexylene diisocyanate and isophorone diisocyanate; aromatic isocyanates such as 2,4-tolylene diisocyanate, 4,4'-diphenylmethane diisocyanate and xylylene diisocyanate; isocyanate adducts such as trimethylolpropane/tolylene diisocyanate trimer adducts (e.g "CORONATE L" manufactured by Tosoh Corporation), trimethylolpropane/hexamethylene diisocyanate trimer adducts (e.g "CORONATE HL" manufactured by Tosoh Corporation), trimethylolpropane adducts of xylylene diisocyanate (e.g "TAKENATE D110N" manufactured by Mitsui Chemicals, Incorporated) and isocyanurate forms of hexamethylene diisocyanate (e.g "CORONATE HX" manufactured by Tosoh Corporation).

As the epoxy-based crosslinker, a polyfunctional epoxy compound having two or more epoxy groups in one molecule is used. The epoxy group of the epoxy-based crosslinker may be a glycidyl group. Examples of the epoxy-based crosslinker include N,N,N',N'-tetraglycidyl-m-xylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ether, o-phthalic acid diglycidyl ester, triglycidyl-tris(2-hydroxyethyl)isocyanurate, resorcin diglycidyl ether and bisphenol-S-diglycidyl ether. A commercially available product such as "Denacol" manufactured by Nagase ChemteX Corporation, or "TETRAD X" or "TETRAD C" manufactured by Mitsubishi Gas Chemical Company, Inc. may be used as the epoxy-based crosslinker.

The amount of the crosslinker may be appropriately adjusted according to the composition and molecular weight of the base polymer, etc. The amount of the crosslinker is about 0.1 to 10 parts by weight, preferably 0.3 to 7 parts by weight, more preferably 0.5 to 5 parts by weight, further preferably 1 to 4 parts by weight based on 100 parts by weight of the base polymer. In addition, a value obtained by dividing the amount (parts by weight) of the crosslinker based on 100 parts by weight of the base polymer by the functional group equivalent weight (g/eq) of the crosslinker is preferably 0.00015 to 0.11, more preferably 0.001 to 0.077, further preferably 0.003 to 0.055, especially preferably 0.0045 to 0.044. When the amount of the crosslinker is larger than that in a general optical transparent acrylic pressure sensitive adhesive, the gel fraction tends to rise to increase the $G'_i$ of the pressure sensitive adhesive, leading to improvement of reworkability.

A crosslinking catalyst may be used for accelerating formation of a crosslinked structure. Examples of the crosslinking catalyst of the isocyanate-based crosslinker include metal-based crosslinking catalysts (particularly tin-based crosslinking catalysts) such as tetra-n-butyl titanate, tetraisopropyl titanate, NACEM ferric, butyl tin oxide, dioctyl tin dilaurate and dibutyl tin dilaurate. The amount of the crosslinking catalyst is generally 0.05 parts by weight or less based on 100 parts by weight of the base polymer.

(Photocurable Agent)

The pressure sensitive adhesive composition that forms the pressure sensitive adhesive layer 2 contains a photocurable agent in addition to the base polymer. When the pressure sensitive adhesive layer 2 formed of a photocurable pressure sensitive adhesive composition is photocured after being bonded to an adherend, the frictional force increases, so that adhesive force with the adherend is improved.

As the photocurable agent, a photocurable monomer or a photocurable oligomer is used. The photocurable agent is preferably a compound having two or more ethylenically unsaturated bonds per molecule. In addition, the photocurable agent is preferably a compound having compatibility with the base polymer. The photocurable agent is preferably liquid at normal temperature because it has moderate compatibility with the base polymer. Since the photocurable agent is compatible with the base polymer, and is uniformly dispersed in the composition, the contact area with an adherend can be secured, and the pressure sensitive adhesive layer 2 having high transparency can be formed.

The compatibility of the base polymer and the photocurable agent is influenced mainly by the structure of the compound. The structure of the compound and the compatibility can be evaluated by, for example, the Hansen solubility parameter, and the compatibility tends to be enhanced as the difference in solubility parameter between the base polymer and the photocurable agent decreases.

It is preferable to use a polyfunctional (meth)acrylate as the photocurable agent because it has high compatibility with an acrylic base polymer. Examples of the polyfunctional (meth)acrylate include polyethylene glycol di(meth)acrylate, polypropylene glycol di(meth)acrylate, polytetramethylene glycol di(meth)acrylate, bisphenol A ethylene oxide-modified di(meth)acrylate, bisphenol A propylene oxide-modified (meth)acrylate, alkanediol di(meth)acrylate, tricyclodecane dimethanol di(meth)acrylate, ethoxylated isocyanuric acid tri(meth)acrylate, pentaerythritol tri(meth)acrylate, pentaerythritol di(meth)acrylate, trimethylolpropane tri(meth)acrylate, ditrimethylolpropane tetra(meth)acrylate, ethoxylated pentaerythritol tetra(meth)acrylate, pentaerythritol tetra(meth)acrylate, dipentaerythritol poly(meth)acrylate, dipentaerythritol hexa(meth)acrylate, neopentyl glycol di(meth)acrylate, glycerin di(meth)acrylate, urethane (meth)acrylate, epoxy (meth)acrylate, butadiene (meth)acrylate and isoprene (meth)acrylate.

The compatibility of the base polymer and the photocurable agent is also influenced by the molecular weight of the compound. The compatibility with the base polymer tends to be enhanced as the molecular weight of the photocurable compound decreases. From the viewpoint of compatibility with the base polymer, the molecular weight of the photocurable agent is preferably 1,500 or less, more preferably 1,000 or less.

The type and the content of the photocurable agent influence mainly the adhesive force of the pressure sensitive adhesive layer after photocuring. Adhesive force after photocuring tend to increase as the functional group equivalent weight decreases (i.e. the number of functional groups per unit molecular weight increases), and the content of the photocurable agent increases.

From the viewpoint of increasing the adhesive force after photocuring, the functional group equivalent weight (g/eq) of the photocurable agent is preferably 500 or less, more preferably 450 or less. On the other hand, excessively large photo-crosslinking density tends to reduce viscosity of the pressure sensitive adhesive, leading to reduction of adhesive force. Therefore, the functional group equivalent weight of the photocurable agent is preferably 100 or more, more preferably 130 or more, further preferably 150 or more, especially preferably 180 or more.

In a combination of the acrylic base polymer and the polyfunctional acrylate photocurable agent, the photocurable agent having a low functional group equivalent weight may have strong interaction with the base polymer, leading to an increase in initial adhesive force. In applications of the present invention, an excessive increase in initial adhesive force may lead to deterioration of reworkability. From the viewpoint of keeping the adhesive force between the pressure sensitive adhesive layer 2 before photocuring and the adherend within an appropriate range, the functional group equivalent weight of the photocurable agent is preferably within the above-mentioned range.

The content of the photocurable agent in the pressure sensitive adhesive composition is preferably 1 to 50 parts by weight, more preferably 5 to 40 parts by weight, further preferably 10 to 35 parts by weight based on 100 parts by weight of the base polymer. When the pressure sensitive adhesive composition contains the photocurable compound as an uncured monomer or oligomer, the photocurable pressure sensitive adhesive layer 2 is obtained. Preferably the photocurable agent is added in the polymer solution after polymerization of the base polymer so that the composition contains the photocurable agent in an uncured state.

When the content of the photocurable agent in the pressure sensitive adhesive composition increases, the photocurable agent may easily bleeds out to the surface. When the photocurable agent bleeds out in a large amount, deterioration of transparency or reduction of adhesive force may occur. On the other hand, when a small amount of the photocurable agent bleeds out to the surface, the frictional force of the pressure sensitive adhesive layer decreases due to formation of a WBL. Accordingly, it is possible to moderately reduce adhesive force with an adherend, so that reworkability tends to be improved.

(Photoinitiator)

Preferably, the pressure sensitive adhesive layer 2 contains a photoinitiator. When irradiated with an active ray, the photoinitiator generates an active species to accelerate curing reaction of the photocurable agent. As the photoinitiator, a photocationic initiator (photoacid generator), a photoradical initiator, a photoanionic initiator (photobase generator), or the like is used according to the type of the photocurable agent or the like. When a polyfunctional acrylate is used as the photocurable agent, it is preferable to use a photoradical initiator. The photoradical initiator is preferably a photoradical generator which is cleaved by an ultraviolet ray or visible light with a wavelength shorter than 450 nm to generate radicals, and examples thereof include hydroxy ketones, benzyl dimethyl ketals, aminoketones, acylphosphine oxides, and benzophenones, trichloromethyl group-containing triazine derivatives. A photoradical generator may be used alone, or two or more photoradical generators may be used in combination. The content of the photopolymerization initiator in the pressure sensitive adhesive layer 2 is preferably from 0.001 to 10 parts by weight, more preferably from 0.01 to 5 parts by weight based on 100 parts by weight of the pressure sensitive adhesive layer 2.

(Other Additives)

Besides the components mentioned above, the pressure sensitive adhesive layer may contain additives such as a silane coupling agent, a tackifier, a plasticizer, a softener, a degradation inhibitor, a filler, a colorant, an ultraviolet absorber, an antioxidant, a surfactant and an antistatic agent within the range of not impairing the characteristics of the present invention.

[Preparation of Reinforcing Film]

By stacking the photocurable pressure sensitive adhesive layer 2 on the film substrate 1, a reinforcing film is obtained. The pressure sensitive adhesive layer 2 may be formed directly on the film substrate 1, or a pressure sensitive adhesive layer formed in a sheet shape on another substrate may be transferred onto the film substrate 1.

The pressure sensitive adhesive layer can be formed by applying the above mentioned pressure sensitive adhesive composition on a substrate by roll coating, kiss roll coating, gravure coating, reverse coating, roll brushing, spray coating, dip roll coating, bar coating, knife coating, air knife coating, curtain coating, lip coating, die coating, or the like, and drying and removing the solvent as necessary. As a method for drying, a suitable method can be appropriately employed. The heating/drying temperature is preferably 40° C. to 200° C., more preferably 50° C. to 180° C., further preferably 70° C. to 170° C. The drying time is preferably 5 seconds to 15 minutes, more preferably 5 seconds to 20 minutes, further preferably 10 seconds to 10 minutes.

When the pressure sensitive adhesive composition contains a crosslinker, it is preferable that crosslinking is allowed to proceed by heating or aging concurrently with drying of the solvent or after drying of the solvent. The heating temperature and the heating time are appropriately set according to a type of crosslinker to be used, and crosslinking is normally performed by heating at 20° C. to 160° C. for 1 minute to about 7 days. Heating for drying and removing solvent may also serve as heating for crosslinking.

By introducing a crosslinked structure into the base polymer, the gel fraction tends to be increased, leading to an increase in storage elastic modulus of the pressure sensitive adhesive layer 2. As the gel fraction increases, the pressure sensitive adhesive tends to become harder, leading to suppression of an adhesive deposit on an adherend at the time of peeling off the reinforcing film from the adherend in rework etc. The gel fraction of the pressure sensitive adhesive layer 2 before photocuring (i.e. the gel fraction of the photocurable composition that forms the pressure sensitive adhesive layer) may be 30% or more or 50% or more. The gel fraction of a photocurable composition is preferably 60% or more, more preferably 65% or more, further preferably 70% or more. The gel fraction may be 75% or more. When the gel fraction of the pressure sensitive adhesive layer 2 before photocuring is excessively large, the anchoring force on an adherend may be reduced, resulting in insufficient initial adhesive force. Thus, the gel fraction of the pressure sensitive adhesive layer 2 before photocuring is preferably 95% or less, more preferably 90% or less, further preferably 85% or less, especially preferably 80% or less. The gel fraction can be determined as a content of components insoluble in a solvent such as ethyl acetate, and specifically the gel fraction is determined as a weight fraction (unit: % by weight) of insoluble components after immersion of the pressure sensitive adhesive layer in ethyl acetate at 23° C. for 7 days to the sample before immersion. Generally, the gel fraction of the polymer is equal to a crosslinking degree, and the gel fraction becomes higher as the number of crosslinked moieties in the polymer increases.

Even after introduction of a crosslinked structure into the polymer by the crosslinker, the photocurable agent maintains an unreacted state. Thus, the photocurable pressure sensitive adhesive layer 2 containing a base polymer and a photocurable agent is formed. When the pressure sensitive adhesive layer 2 is formed on the film substrate 1, it is preferable to provide the separator 5 on the pressure sensitive adhesive layer 2 for the purpose of, for example, protecting the pressure sensitive adhesive layer 2. Crosslinking may be performed after the separator 5 is provided on the pressure sensitive adhesive layer 2.

When the pressure sensitive adhesive layer 2 is formed on another substrate, a reinforcing film is obtained by transferring the pressure sensitive adhesive layer 2 onto the film substrate 1 after the solvent is dried. The substrate used for forming the pressure sensitive adhesive layer may be used as it is as the separator 5.

As the separator 5, plastic films such as those of polyethylene, polypropylene, polyethylene terephthalate and polyester film are preferably used. The thickness of the separator is normally about 3 to 200 μm, preferably about 10 to 100 μm. Preferably the contact surface between the separator 5 and the pressure sensitive adhesive layer 2 is subjected to release treatment with a release agent such as a silicone-based release agent, a fluorine-based release agent, a long-chain alkyl-based release agent or a fatty acid amide-based release agent, or silica powder. When a surface of the separator 5 is subjected to release treatment, peeling occurs at an interface between the pressure sensitive adhesive layer 2 and the separator 5 at the time of peeling off the film substrate 1 and the separator 5 from each other, and a state is maintained in which the pressure sensitive adhesive layer 2 is fixed on the film substrate 1.

[Use of Reinforcing Film]

The reinforcing film of the present invention is used in a state of being bonded to a device or a device constituent component. The reinforcing film 10 has the pressure sensitive adhesive layer 2 fixed to the film substrate 1, and has small adhesive force to an adherend after bonding to the adherend and before photocuring. Thus, before photocuring, it is easy to peel off the reinforcing film from the adherend, and excellent reworkability is exhibited. In addition, before photocuring, processing can be easily performed in which the reinforcing film is cut to remove the reinforcing film in some regions of a surface of the adherend.

(Bonding to Adherend and Photocuring)

The adherend to which the reinforcing film is bonded is not particularly limited, and examples thereof include various electronic devices, optical devices, and constituent components of these devices. The reinforcing film may be bonded to the entire surface of the adherend, or may be selectively bonded only to a portion which needs reinforcement. In addition, after the reinforcing film is bonded to the entire surface of the adherend, the reinforcing film at a portion which does not need reinforcement may be cut to peel off and remove the reinforcing film. Before photocuring, the reinforcing film is in a state of being temporarily attached to a surface of the adherend, and therefore the reinforcing film can be easily peeled off and removed from the surface of the adherend.

After the reinforcing film is bonded to the adherend, the pressure sensitive adhesive layer 2 is irradiated with an active ray to photocure the pressure sensitive adhesive layer. Examples of the active ray include ultraviolet rays, visible light, infrared rays, X rays, $\alpha$ rays, $\beta$ rays and $\gamma$ rays. The active ray is preferably an ultraviolet ray because curing of the pressure sensitive adhesive layer in a storage state can be suppressed and curing is easy. The irradiation intensity and the irradiation time of the active ray may be appropriately set according to the composition, thickness and the like of the pressure sensitive adhesive layer. The pressure sensitive adhesive layer 2 may be irradiated with the active ray from either the film substrate 1-side or the adherend-side, or from both the sides.

In the reinforcing film of the present invention, the pressure sensitive adhesive layer 2 is photocurable, and the timing of curing can be freely set. Treatment such as rework or processing of the reinforcing film can be performed at any timing until the pressure sensitive adhesive is photocured after the reinforcing film is attached to the adherend, and therefore it is possible to flexibly adapt to the lead time of a process for producing a device.

[Usage Embodiment of Reinforcing Film]

The reinforcing film of the present invention is used in a state of being bonded to constituent member (products-in-process) of various devices, or completed devices. By bonding the reinforcing film, moderate rigidity is imparted so that effects such as improved handleability and preventing damages can be expected. When the reinforcing film is bonded to a product-in-process in a process for producing a device, the reinforcing film may be bonded to a large-size product-in-process before it is cut to a product size. The reinforcing film may be bonded in a roll-to-roll manner to a mother roll of a device that is produced by a roll-to-roll process.

As devices are highly integrated, and as devices become smaller lighter and thinner, the thickness of members that forms the device tends to decrease. As the constituent members become thinner, bending and curling easily occurs due to stress and the like at the stacking interface. In addition, self-weight deflection easily occurs due to thinning. By bonding the reinforcing film, rigidity can be imparted to the adherend, and therefore bending, curling, deflection and the like due to stress, self-weight and the like are suppressed, so that handleability is improved. Thus, by bonding the reinforcing film to a product-in-process in a process for producing a device, failures and defects in conveyance and processing by automated equipment can be prevented.

In automatic conveyance, contact of a product-in-process to be conveyed with a conveyance arm, a pin or the like is unavoidable. In addition, for adjustment of the shape and removal of unnecessary portions, the product-in-process may be cut. A device which is highly integrated, made small, light and thinned is easily damaged by localized stress concentration when brought into contact with conveyance equipment or subjected to cutting processing. In a process for producing a device in which a plurality of members is stacked, not only the members are sequentially stacked, but also some of the members, process materials and the like may be peeled off and removed from the product-in-process. When the member is thinned, stress may be locally concentrated on a peeled part and the vicinity thereof, resulting in occurrence of damage or a dimensional change. The reinforcing film has stress dispersibility associated with the pressure sensitive adhesive layer, and therefore by bonding the reinforcing film to an object to be conveyed and an object to be processed, moderate rigidity is imparted, and stress is relaxed and dispersed, so that it is possible to suppress defects such as cracks, breaks, peeling, dimensional changes and the like.

As described above, by bonding the reinforcing film of the present invention, moderate rigidity is imparted to a product-in-process which is an adherend, and stress is relaxed and dispersed, so that various defects which may occur in a production process can be suppressed, production efficiency can be enhanced, and the yield can be improved. In addition, since the reinforcing film is easy to peel off from the adherend before the pressure sensitive adhesive layer is photocured, rework is easy even if a stacking or bonding defect occurs.

In use of a completed device, even when an external force is suddenly applied due to falling of the device, placement of heavy objects on the device, collision of a flying object to the device, or the like, damage to the device can be prevented because the reinforcing film is bonded. In addition, since the reinforcing film after photocuring of the pressure sensitive adhesive is firmly adhered to the device, the reinforcing film is hardly peeled off even in long-term use, and is thus excellent in reliability.

EXAMPLES

Hereinbelow, further explanation is made by showing Examples and Comparative Examples, but the present invention is not limited to these Examples.

[Polymerization of Acrylic Polymer]

<Polymer A>

63 parts by weight of butyl acrylate 2-ethy hexyl acrylate (2HEA), 15 part by weight of N-vinylpyrrolidone (NVP), 9 parts by weight of methyl methacrylate (MMA) and 13 parts by weight of hydroxyethyl acrylate (HEA) as monomer components, 0.2 part by weight of azobisisobutyronitrile as a polymerization initiator, and 233 parts by weight of ethyl acetate as a solvent were put into a reaction vessel provided with a thermometer, a stirrer, a cooling tube and a nitrogen gas inlet. Nitrogen was purged for 1 hour while the mixture was stirred to perform nitrogen replacement. Thereafter, the mixture was reacted at 60° C. for 7 hours to obtain a solution of acrylic polymer A having a weight average molecular weight (Mw) of 1,200,000.

<Polymer B>

The amounts of monomers were changed to 72 parts by weight of 2EHA, 14 parts by weight of NVP, 1 part by weight of MMA and 13 parts by weight of HEA. Except for the above, polymerization was performed in the same manner as in the case of polymer A to obtain a solution of acrylic polymer B having a Mw of 1,000,000.

<Polymer C>

The amounts of monomers were changed to 96 parts by weight of 2EHA and 4 parts by weight of NVP. Except for the above, polymerization was performed in the same manner as in the case of polymer A to obtain a solution of acrylic polymer C having a Mw of 550,000.

<Polymer D>

The amounts of monomers were changed to 95 parts by weight of 2EHA and 5 parts by weight of HEA. Except for the above, polymerization was performed in the same manner as in the case of polymer A to obtain a solution of acrylic polymer D having a Mw of 440,000.

<Polymer E>

The amounts of monomers were changed to 75 parts by weight of butyl acrylate (BA), 20 parts by weight of MMA and 5 parts by weight of HEA. Except for the above, polymerization was performed in the same manner as in the case of polymer A to obtain a solution of acrylic polymer E having a Mw of 600,000.

<Polymer F>

The amounts of monomers were changed to 95 parts by weight of BA and 5 parts by weight of acrylic acid (AA). Except for the above, polymerization was performed in the same manner as in the case of polymer A to obtain a solution of acrylic polymer F having a Mw of 500,000.

The monomer ratios and weight average molecular weights of the acrylic polymers A to F are listed in Table 1.

TABLE 1

| | Monomer component (wt %) | | | | | | |
|---|---|---|---|---|---|---|---|
| | 2EHA | NVP | MMA | HEA | AA | BA | Mw |
| Polymer A | 63 | 15 | 9 | 13 | — | — | 1,200,000 |
| Polymer B | 72 | 14 | 1 | 13 | — | — | 1,000,000 |
| Polymer C | 96 | — | — | 4 | — | — | 550,000 |
| Polymer D | 95 | — | — | 5 | — | — | 440,000 |
| Polymer E | — | — | 20 | 5 | — | 75 | 600,000 |
| Polymer F | — | — | — | — | 5 | 95 | 500,000 |

[Preparation of Reinforcing Film]

<Preparation of Pressure Sensitive Adhesive Composition>

A crosslinker, a photocurable agent, and a photopolymerization initiator were added to an acrylic polymer solution, and the mixture was uniformly mixed to prepare pressure sensitive adhesive compositions 1 to 21 shown in Table 2. As the photopolymerization initiator, 0.1 parts by weight of 1-hydroxycyclohexyl phenyl ketone ("Irgacure 184" manufactured by BASF) was added based on 100 parts by weight of the solid content of the polymer. The crosslinker and the photocurable agent were added so as to give a composition as shown in Table 2. The amount (parts by weight of solid content) in Table 2 is based on 100 parts by weight of the base polymer. Details of the crosslinker and the photocurable agent are as follows.

(Crosslinker)

TAKENATE D 110N: 75% ethyl acetate solution of trimethylolpropane adduct of xylylene diisocyanate (manufactured by Mitsui Chemicals, Inc.)

CORONATE HX: isocyanurate form of hexamethylene diisocyanate (manufactured by Tosoh Corporation)

TETRAD C: N,N,N',N'-tetraglycidyl-m-xylylenediamine (tetrafunctional epoxy compound manufactured by Mitsubishi Gas Chemical, Company)

(Photocurable Agent)

APG 200: polypropylene glycol #200 (n=3) diacrylate; functional group equivalent weight: 150 g/eq APG 400: polypropylene glycol #400 (n=7) diacrylate; functional group equivalent weight: 268 g/eq APG 700: polypropylene glycol #700 (n=12) diacrylate; functional group equivalent weight: 404 g/eq A200: polyethylene glycol #200 (n=4) diacrylate; functional group equivalent weight: 154 g/eq A400: polyethylene glycol #400 (n=9) diacrylate; functional group equivalent weight: 254 g/eq TMPTA: trimethylolpropane triacrylate; functional group equivalent weight: 99 g/eq A-DPH: dipentaerythritol hexaacrylate; functional group equivalent weight: 96 g/eq A-DCP: tricyclodecane dimethanol diacrylate; functional group equivalent weight: 152 g/eq A-HD-N: 1,6-hexanediol diacrylate; functional group equivalent weight: 113 g/eq (All of the above agents are manufactured by Shin-Nakamura Chemical Co., Ltd.)

<Application and Crosslinking of Pressure Sensitive Adhesive Solution>

Using a fountain roll, the above-described pressure sensitive adhesive composition was applied, so as to have a thickness of 25 μm after drying, onto a 75 μm-thick polyethylene terephthalate film ("LUMIRROR S10" manufactured by Toray Industries, Inc.) which had not been subjected to surface treatment. The applied composition was dried at 130° C. for 1 minute to remove the solvent, a release-treated surface of a separator (a 25 μm-thick polyethylene terephthalate film with a surface subjected to silicone release treatment) was bonded to the coating surface of the pressure sensitive adhesive. Thereafter, aging was performed in an atmosphere at 25° C. for 4 days, so that crosslinking proceeded, thereby obtaining a reinforcing film in which a photocurable pressure sensitive adhesive sheet was laminated and fixed on a substrate and a separator was temporarily attached on the pressure sensitive adhesive sheet.

[Evaluation]

<Molecular Weight>

The weight average molecular weight (Mw) of the base polymer in terms of polystyrene was measured by a GPC ("HLC-8220GPC", manufactured by TOSOH CORPORATION). The measurement conditions were the follows:

Sample concentration: 0.2% by weight (tetrahydrofuran solution)

Injection volume: 10 μL

Eluent: THF

Flow rate: 0.6 mL/minute

Measurement temperature: 40° C.

Sample column: TSKguardcolumn SuperHZ-H (×1)+TSKgel SuperHZM-H (×2)

Reference column: TSKgel SuperH-RC (×1)

Detector: RI

<Gel Fraction>

The pressure sensitive adhesive of the reinforcing film was collected and weighted. The sample was wrapped in a porous polytetrafluoroethylene film, and the wrapped opening was tied with a kite string. The total weight (A) of the porous polytetrafluoroethylene film and the kite string measured beforehand was subtracted from the weight of this sample to calculate the weight (B) of the pressure sensitive adhesive sample. The pressure sensitive adhesive sample wrapped in the porous polytetrafluoroethylene film was immersed in approximately 50 mL of ethyl acetate at 23° C. for 7 days to elute sol components of the pressure sensitive adhesive to the outside of the polytetrafluoroethylene film. After immersion, the pressure sensitive adhesive wrapped in the porous polytetrafluoroethylene film was taken out, dried at 130° C. for 2 hours, and allowed to cool for about 30 minutes, and the dry weight (C) was measured. The gel fraction of the pressure sensitive adhesive was calculated from the following formula.

$$\text{gel fraction (\%)}=100\times(C-A)/B$$

<Frictional Force>

The separator was peeled off from the reinforcing film to prepare a sample for measuring the frictional force of the pressure sensitive adhesive before photocuring. After the separator peeled off from the reinforcing film, an ultraviolet ray was applied from the exposed surface of the pressure sensitive adhesive layer to photocure the pressure sensitive adhesive layer, thereby obtaining a sample for measuring the frictional force of the photocured pressure sensitive adhesive. Measurement was performed under the following conditions in the FFM mode with a scanning probe microscope ("AFM 5300E" manufactured by Hitachi High-Tech Science Co., Ltd.), frictional measurement was performed with a scan width of 5 μm in one direction (scanning over 10 μm in reciprocation), and a differential voltage was read at a position of 3 μm from the left side of the measurement range.

(Measurement Conditions)

Cantilever: "Tap 300E-G" (product with a spring constant of 40 N/m) manufactured by BudgetSensors ADD value: 8.44 V DIF value: 0.4 V FFM value: 0 V Atmosphere: vacuum or atmospheric pressure, room temperature Scanning speed: 0.1 Hz, 1 Hz and 5 Hz For reinforcing films including pressure sensitive adhesive sheets of compositions 1 to 20, measurement was performed under vacuum. For a reinforcing film including a pressure sensitive adhesive sheet of composition 21, it was not possible to perform accurate measurement because the sample before photocuring of the pressure sensitive adhesive was wavy under vacuum, and thus measurement was performed under atmospheric pressure before and after photocuring.

<Adhesive Force>

A 12.5 μm-thick polyimide film ("Kapton 50EN" manufactured by Du Pont-Toray Co., Ltd.) was attached to a glass plate with a double-sided adhesive tape ("No. 531" manufactured by Nitto Denko Corporation) interposed therebetween, thereby obtaining a polyimide film substrate for measurement. The separator was peeled off and removed from the surface of the reinforcing film cut to a width of 25 mm and a length of 100 mm. Using a hand roller, the reinforcing film was bonded to a polyimide film substrate for measurement so that a test sample before photocuring is prepared. The test sample before photocuring was irradiated with an ultraviolet ray from the reinforcing film-side (polyethylene terephthalate film-side) to photocure the pressure sensitive adhesive layer, thereby preparing a test sample after photocuring. An end portion of the polyethylene terephthalate film of a reinforcing film in each of these test samples was held with a chuck, 180° peeling of the reinforcing film was performed at a tensile speed of 300 mm/min, and the peel strength was measured.

Table 2 shows the compositions and results of measurement of the frictional force and the adhesive force for the pressure sensitive adhesive of each of the reinforcing sheets. Each of the frequency dependence before photocuring and the frequency dependency after photocuring in Table 2 is a ratio of the FFM voltage measured at a frequency of 5 Hz to the FFM voltage measured at a frequency of 0.1 Hz for the pressure sensitive adhesive layer before and after photocuring. Since the FFM voltage and the frictional force are proportional to each other, the ratio of the FFM voltages is equal to the ratio of the frictional forces.

TABLE 2

| | | Composition of pressure sensitive adhesive | | | | | Frictional force | | | Frequency dependence before photocuring |
|---|---|---|---|---|---|---|---|---|---|---|
| | | Crosslinker | | Photocurable agent | | Gel fraction | Before photocuring (mV) | | | |
| | Polymer | Type | Amount | Type | Amount | (%) | 0.1 Hz | 1 Hz | 5 Hz | |
| Composition 1 | A | TAKENATE D110N | 2.5 | APG200 | 20 | 79.8 | 223 | 630 | 1497 | 6.7 |
| Composition 2 | A | TAKENATE D110N | 2.5 | APG400 | 20 | 79.2 | 93 | 203 | 423 | 4.5 |
| Composition 3 | A | TAKENATE D110N | 2.5 | APG700 | 20 | 73.3 | 130 | 250 | 523 | 4.0 |
| Composition 4 | A | TAKENATE D110N | 2.5 | A200 | 20 | 77.9 | 110 | 257 | 513 | 4.7 |
| Composition 5 | A | TAKENATE D110N | 2.5 | A200 | 30 | 71.3 | 150 | 300 | 610 | 4.1 |
| Composition 6 | A | TAKENATE D110N | 2.5 | A400 | 20 | 75.0 | 130 | 240 | 507 | 3.9 |
| Composition 7 | A | TAKENATE D110N | 2.5 | TMPTA | 20 | 79.2 | 207 | 527 | 1253 | 6.1 |
| Composition 8 | A | TAKENATE D110N | 2.5 | A-DPH | 20 | 76.3 | 183 | 510 | 1257 | 6.9 |
| Composition 9 | A | TAKENATE D110N | 2.5 | A-DCP | 20 | 77.4 | 140 | 337 | 747 | 5.3 |
| Composition 10 | A | TAKENATE D110N | 2.5 | A-HD-N | 20 | 75.5 | 367 | 1020 | 2527 | 6.9 |
| Composition 11 | A | TAKENATE D110N | 2.5 | APG700 | 10 | 85.4 | 173 | 423 | 953 | 5.5 |
| Composition 12 | A | TAKENATE D110N | 2.5 | APG700 | 30 | 70.1 | 83 | 147 | 257 | 3.1 |
| Composition 13 | A | TAKENATE D110N | 2.5 | APG700 | 40 | 68.9 | 70 | 110 | 200 | 2.9 |
| Composition 14 | B | TAKENATE D110N | 2.5 | TMPTA | 20 | 74.6 | 123 | 273 | 553 | 4.5 |
| Composition 15 | B | TAKENATE D110N | 2.5 | APG700 | 20 | 71.5 | 92 | 170 | 283 | 3.1 |
| Composition 16 | D | TAKENATE D110N | 2.0 | TMPTA | 20 | 71.4 | 29 | 53 | 96 | 3.3 |
| Composition 17 | D | TAKENATE D110N | 2.0 | APG700 | 20 | 66.3 | 2 | 14 | 30 | 15.2 |
| Composition 18 | E | TAKENATE D110N | 2.0 | TMPTA | 20 | 74.8 | 80 | 137 | 207 | 2.6 |
| Composition 19 | E | TAKENATE D110N | 2.0 | APG700 | 20 | 74.9 | 79 | 107 | 137 | 1.7 |
| Composition 20 | C | CORONATE HX | 4.0 | APG700 | 20 | 60.4 | 31 | 43 | 50 | 1.6 |
| Composition 21 | F | TETRAD C | 0.5 | A200 | 30 | 75.9 | 40 | 80 | 90 | 2.3 |

| | Frictional force | | | Frequency dependence after photocuring | Frictional force (5 Hz) increase ratio (times) | Adhesive force | | |
|---|---|---|---|---|---|---|---|---|
| | After photocuring (mV) | | | | | Before photocuring N/25 mm | After photocuring N/25 mm | Increase ratio (times) |
| | 0.1 Hz | 1 Hz | 5 Hz | | | | | |
| Composition 1 | 470 | 1313 | 3103 | 6.6 | 2.1 | 1.36 | 12.16 | 8.9 |
| Composition 2 | 277 | 703 | 1747 | 6.3 | 4.1 | 1.19 | 16.33 | 13.7 |
| Composition 3 | 323 | 803 | 1830 | 5.7 | 3.5 | 1.30 | 19.57 | 15.1 |
| Composition 4 | 393 | 1147 | 2750 | 7.0 | 5.4 | 0.58 | 24.13 | 41.6 |
| Composition 5 | 400 | 1330 | 3210 | 8.0 | 5.3 | 0.35 | 25.06 | 71.6 |
| Composition 6 | 347 | 983 | 2480 | 7.2 | 4.9 | 0.01 | 11.34 | 1134 |
| Composition 7 | 550 | 1577 | 3427 | 6.2 | 2.7 | 5.73 | 8.55 | 1.5 |
| Composition 8 | 760 | 1767 | 3587 | 4.7 | 2.9 | 13.47 | 2.79 | 0.2 |
| Composition 9 | 510 | 1393 | 3163 | 6.2 | 4.2 | 3.95 | 4.19 | 1.1 |
| Composition 10 | 557 | 1640 | 3480 | 6.3 | 1.4 | 4.80 | 21.68 | 4.5 |
| Composition 11 | 393 | 1110 | 2413 | 6.1 | 2.5 | 7.26 | 17.45 | 2.4 |
| Composition 12 | 247 | 660 | 1503 | 6.1 | 5.9 | 0.65 | 14.04 | 21.7 |
| Composition 13 | 203 | 480 | 1077 | 5.3 | 5.4 | 0.56 | 10.51 | 18.9 |
| Composition 14 | 213 | 520 | 1153 | 5.4 | 2.1 | 0.93 | 10.26 | 11.1 |
| Composition 15 | 160 | 317 | 607 | 3.8 | 2.1 | 0.59 | 2.86 | 4.9 |
| Composition 16 | 4 | 12 | 40 | 11.0 | 0.4 | 0.53 | 15.35 | 28.8 |
| Composition 17 | 3 | 5 | 17 | 6.4 | 0.6 | 0.29 | 0.80 | 2.8 |
| Composition 18 | 117 | 207 | 363 | 3.1 | 1.8 | 0.99 | 6.86 | 6.9 |
| Composition 19 | 113 | 190 | 300 | 2.6 | 2.2 | 0.71 | 2.06 | 2.9 |
| Composition 20 | 36 | 55 | 87 | 2.4 | 1.7 | 0.43 | 0.81 | 1.9 |
| Composition 21 | 80 | 240 | 450 | 5.6 | 5.0 | 0.15 | 9.80 | 65.3 |

Results in Table 2 show that the frictional force and the frequency dependence of the frictional force of the pressure sensitive adhesive layer before photocuring has a high correlation with the adhesive force before photocuring (initial adhesive force), and initial adhesive force tends to increase as frequency dependence becomes larger. Results in Table 2 also indicate that the frictional force and the frequency dependence of the frictional force of the pressure sensitive adhesive layer after photocuring has a high correlation with the adhesive force after photocuring, and high correlation between the increase ratio of the adhesive force and the increase ratio of the frictional force before and after photocuring was confirmed.

In the reinforcing films using the pressure sensitive adhesives of compositions 2 to 6, compositions 12 to 14 and composition 16 (combination of an acrylic base polymer, an isocyanate-based crosslinker and a photocurable agent), the adhesive strength before photocuring was 1.3 N/25 mm or less, the adhesive strength after photocuring was 10 N/25 mm or more, and the adhesive strength after photocuring was not less than 10 times the adhesive strength before photocuring. The same applied for the reinforcing film using the pressure sensitive adhesive of the composition 21 containing an acrylic base polymer, an epoxy-based crosslinker and a photocurable agent. These results show that when the frequency dependence of the frictional force falls within a specific range, a reinforcing film is obtained which is easily peeled off from the adherend before photocuring, and can be firmly adhered to the adherend after photocuring.

For compositions 1 to 4 and compositions 6 to 10, the same base polymer was used, and the contents of photocurable agents were the same (the contents of base polymers in the composition were the same), so that there was no significant difference in gel fraction of the pressure sensitive adhesive layer before photocuring. Nevertheless, compositions 1 and 7 to 10 exhibited large frequency dependence of the frictional force of the pressure sensitive adhesive layer before photocuring and large initial adhesive force, and composition 6 exhibited small frequency dependence of the frictional force of the pressure sensitive adhesive layer before photocuring and small initial adhesive force. In compositions 3 and 11 to 13, although the types of base polymers and photocurable agents are the same, there is a difference in amount of the photocurable agent, and the frequency dependence of the frictional force of the pressure sensitive adhesive layer before photocuring decreases and initial adhesive force tends to be reduced as the amount of the photocurable agent increases (the ratio of the base polymer in the composition decreases).

It is considered that a change in initial adhesive force with a change in type and content of the photocurable agent is related to compatibility between the base polymer and the photocurable agent and bleed out of the photocurable agent to the surface of the pressure sensitive adhesive layer. In compositions 3 and 11 to 13, for example, the frictional force and the frequency dependence of the frictional force of the surface of the pressure sensitive adhesive layer decreases and initial adhesive force decreases as the amount of the photocurable agent increases. This is considered to be because the photocurable agent tends to easily bleed out to the surface of the pressure sensitive adhesive layer as the amount of the photocurable agent increases. It is also considered that since compatibility between the base polymer and the photocurable agent is reduced as the molecular weight of the photocurable agent increases, the photocurable agent tends to easily bleed out to the surface of the pressure sensitive adhesive layer, leading to reduction of initial adhesive force.

It is considered that for composition 6 where A400 (polyethylene glycol #400 diacrylate) was used as a photocurable agent, the photocurable agent had high hydrophilicity, and hence low affinity with the base polymer, and had a large molecular weight and functional group equivalent weight, and therefore compatibility between the base polymer and the photocurable agent was low, so that the photocurable agent bled out to the surface of the pressure sensitive adhesive layer, resulting in reduction of initial adhesive force. On the other hand, it is considered that for composition 3 where APG 700 (polypropylene glycol #700 diacrylate) was used as a photocurable agent, the photocurable agent has higher hydrophobicity as compared to composition 6, bleed out of the photocurable agent is suppressed, so that initial adhesive force is maintained. It is considered that for composition 8 where a hexafunctional acrylate was used as a photocurable agent, the density of acryloyl groups in the molecule was high, and functional groups such as C=C, C—O—C and C=O of the photocurable agent acted to enhance interaction, leading to an increase in initial adhesive force to the adherend.

The invention claimed is:

1. A reinforcing film comprising:
a film substrate; and
a pressure sensitive adhesive layer laminated and fixed on one principal surface of the film substrate,
wherein
the pressure sensitive adhesive layer is formed of a photocurable composition comprising of an acrylic base polymer and a photocurable agent,
the acrylic base polymer includes, as a monomer unit, at least one selected from the group consisting of hydroxy group-containing monomer and carboxy group-containing monomer,
the acrylic base polymer has a crosslinked structure,
a gel fraction of the photocurable composition is 60% or more and less than 80%,
wherein
a frictional force of the pressure sensitive adhesive layer measured with a frictional force microscope at a frequency of 5 Hz is 2 to 5 times a frictional force at a frequency of 0.1 Hz, and
the pressure sensitive adhesive layer is configured such that when the pressure sensitive adhesive layer is photocured, a frictional force of a photocured pressure sensitive adhesive layer measured with the frictional force microscope at a frequency of 5 Hz is not less than 5 times a frictional force measured at a frequency of 0.1 Hz.

2. The reinforcing film according to claim 1, wherein the frictional force of the photocured pressure sensitive adhesive layer measured with a frictional force microscope at a frequency of 5 Hz is not less than 2 times the frictional force at a frequency of 5 Hz of the pressure sensitive adhesive layer before photocuring.

3. The reinforcing film according to claim 1, wherein a weight average molecular weight of the acrylic base polymer is 100,000 or more.

4. The reinforcing film according to claim 1, wherein the acrylic base polymer includes, as monomer units, a hydroxy group-containing monomer and a nitrogen-containing monomer.

5. The reinforcing film according to claim 1, wherein the acrylic base polymer contains 5 to 50% by weight of a monomer component having a homopolymer glass transition temperature of 40° C. or higher.

6. The reinforcing film according to claim 1, wherein the gel fraction of the photocurable composition is 70% or more.

7. The reinforcing film according to claim 1, wherein the photocurable composition contains 1 to 50 parts by weight of the photocurable agent based on 100 parts by weight of the acrylic base polymer.

8. The reinforcing film according to claim 1, wherein the photocurable agent is polyfunctional (meth)acrylate.

9. The reinforcing film according to claim 1, wherein a functional group equivalent weight of the photocurable agent is 100 to 500 g/eq.

10. The reinforcing film according to claim 1, wherein an adhesive force between the pressure sensitive adhesive layer and a polyimide film is 1.3 N/25 mm or less, wherein the adhesive force is a 180° peel strength measured with a tensile speed of 300 mm/min.

11. The reinforcing film according to claim 1, wherein the pressure sensitive adhesive layer is configured such that when the pressure sensitive adhesive layer is photocured, an adhesive force between the photocured pressure sensitive adhesive layer and a polyimide film is 10 N/25 mm or more, wherein the adhesive force is a 180° peel strength measured with a tensile speed of 300 mm/min.

12. The reinforcing film according to claim 1, wherein
an adhesive force between the pressure sensitive adhesive layer and a polyimide film is 1.3 N/25 mm or less, and
the pressure sensitive adhesive layer is configured such that when the pressure sensitive adhesive layer is photocured, an adhesive force between the photocured pressure sensitive adhesive layer and the polyimide film is 10 N/25 mm or more,
wherein the adhesive force is a 180° peel strength measured with a tensile speed of 300 mm/min.

* * * * *